T. H. SAVERY.
Condenser Ferrule.

No. 161,707. Patented April 6, 1875.

UNITED STATES PATENT OFFICE.

THOMAS H. SAVERY, OF WILMINGTON, DELAWARE.

IMPROVEMENT IN CONDENSER-FERRULES.

Specification forming part of Letters Patent No. 161,707, dated April 6, 1875; application filed May 29, 1874.

*To all whom it may concern:*

Be it known that I, THOMAS H. SAVERY, of Wilmington, in the county of New Castle and State of Delaware, have invented an Improved Condenser-Ferrule, of which the following is a specification:

Owing to the constant expansion and contraction undergone by condenser-tubes, it is very difficult to secure them properly in their heads, so as to prevent leakage. Wooden ferrules have been used, but are soon destroyed by the combined effects of heat, grease, and moisture to which they are exposed. After much experiment, I have discovered that the article known as "vulcanized fiber" possesses qualities which render it highly valuable in this connection; and my invention consists in a ferrule or packing, for condensers and analogous purposes, made of vulcanized fiber, being a new article of manufacture. This vulcanized fiber is now well known in the trade. Its process of manufacture is described in United States Letters Patent No. 113,454, dated April 4, 1871, and No. 114,880, dated May 16, 1871, and need not be repeated here. It contains no rubber or gutta-percha, however, as its name might imply.

Figure 1:
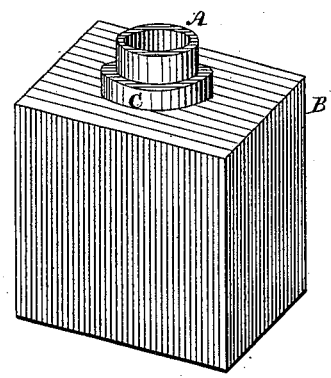
Figure 2:
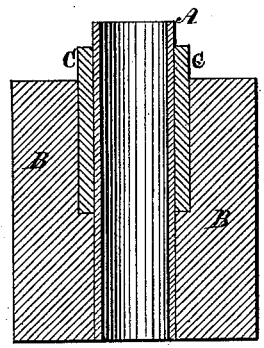

In the accompanying drawings, Figure 1 shows a view, in perspective, of a portion of a condenser-head, a tube, and a ferrule; and Fig. 2, a vertical section therethrough.

The tube A fits snugly in the head B, being free to move endwise therein as it expands and contracts. The ferrule C is inserted in a groove or recess between the head and tube, and packs the joint between them tightly, and yet allows the tube to move in the ferrule. The material of which the ferrule is composed possesses, as I have discovered by experiment, the properties of swelling under heat and moisture, and of resisting their decomposing effects, as well as those of grease, so that the tubes, while free to move endwise with comparatively little friction, are tightly packed.

I have described my invention as applied to a condenser-tube; but, obviously, it may be applied as a packing to other tubes.

I do not claim the method herein described of uniting the ferrule with the head or tube-sheet; but

I claim—

The within-described condenser ferrule or packing, made of vulcanized fiber, the same constituting a new article of manufacture.

In testimony whereof, I have hereunto subscribed my name.

THOS. H. SAVERY.

Witnesses:
 WM. W. PRITCHETT,
 JNO. HENRY PUHL.